United States Patent [19]
Studinger

[11] 3,831,849
[45] Aug. 27, 1974

[54] MOBILE SELF CONTAINED PRESSURE SPRAYER

[76] Inventor: John H. Studinger, 5700 Montview Blvd., Denver, Colo. 80207

[22] Filed: June 26, 1972

[21] Appl. No.: 266,415

[52] U.S. Cl. ................................ 239/127, 239/172
[51] Int. Cl. .............................................. B05b 9/02
[58] Field of Search ........... 239/124, 127, 302, 304, 239/146, 172

[56] References Cited
UNITED STATES PATENTS

| 3,499,606 | 3/1970  | Smith       | 239/304   |
|-----------|---------|-------------|-----------|
| 2,988,286 | 6/1961  | Snyder et al. | 239/127 X |
| 3,421,694 | 1/1969  | Muller      | 239/304 X |
| 2,810,606 | 10/1957 | Taylor      | 239/127 X |
| 3,341,128 | 9/1967  | Nagin et al. | 239/127 X |
| 3,640,461 | 2/1972  | Koll        | 239/304 X |
| 3,312,243 | 4/1967  | Booker      | 239/127 X |

Primary Examiner—M. Henson Wood, Jr.
Assistant Examiner—Michael Y. Mar
Attorney, Agent, or Firm—Richard D. Law

[57] ABSTRACT

A skid mounted sprayer assembly having a gasoline engine driving a high pressure pump, includes tanks for fluids ejected by the pump, providing a mobile source of high pressure cleaning and washing fluids.

1 Claim, 5 Drawing Figures

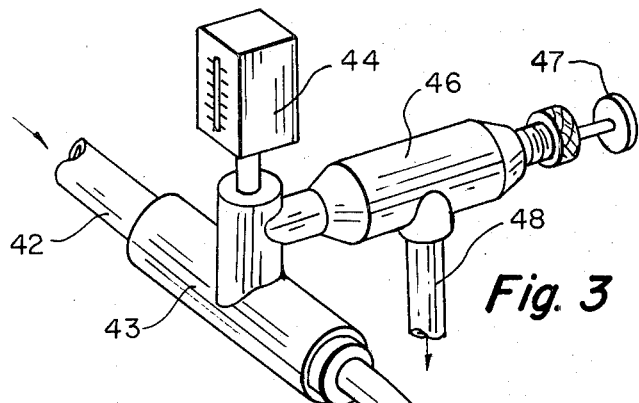
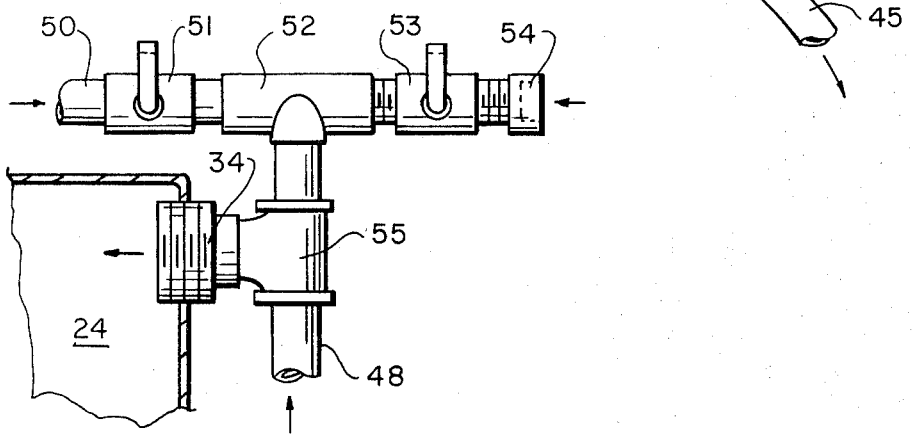
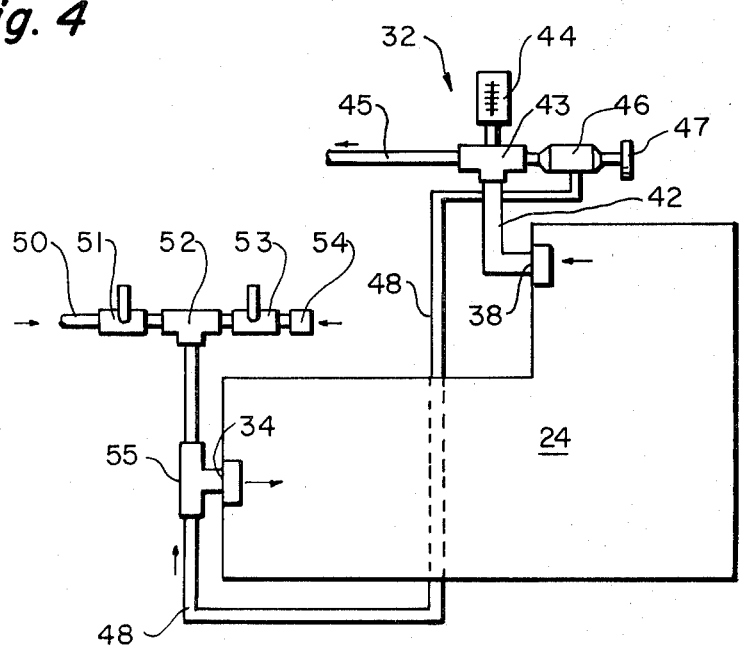

MOBILE SELF CONTAINED PRESSURE SPRAYER

This invention relates to a self-contained, high pressure sprayer mounted on a skid or on a wheeled mount and provided with gasoline engine for operating the high pressure pump. One or more tanks may be mounted on the unit for containing fluids issued from the pump as a high pressure spray. Such high pressure sprayers are useful for washing buildings, equipment, road machinery, aircraft, tire-burned rubber from airport runways, etc. In many locations power and/or a supply of fluid for washing or cleaning is not available. Therefore, the self-contained unit has considerable advantages over stationary units.

Included among the objects and advantages of the present invention is a self-contained, high pressure sprayer mounted for portability away from power and fluid supplies.

Another object of the invention is to provide a mobile self-contained high pressure sprayer having simple controls for operating a mechanism.

Another object of the invention is to provide a mobile self-contained high pressure sprayer composed of assembly of readily available commercial parts.

Another object of the invention is to provide a mobile, self-contained sprayer having an efficient and simple pressure control unit.

These and other objects and advantages of the invention may be readily ascertained by referring to the following description and appended illustrations in which:

FIG. 3 is an enlarged perspective detail of a discharge mechanism;

FIG. 4 is a side elevational view of the valving arrangement for the suction side of pump of the pressure sprayer according to the invention; and FIG. 5 is a schematic piping diagram of the spray system according to the invention.

Figure 1:
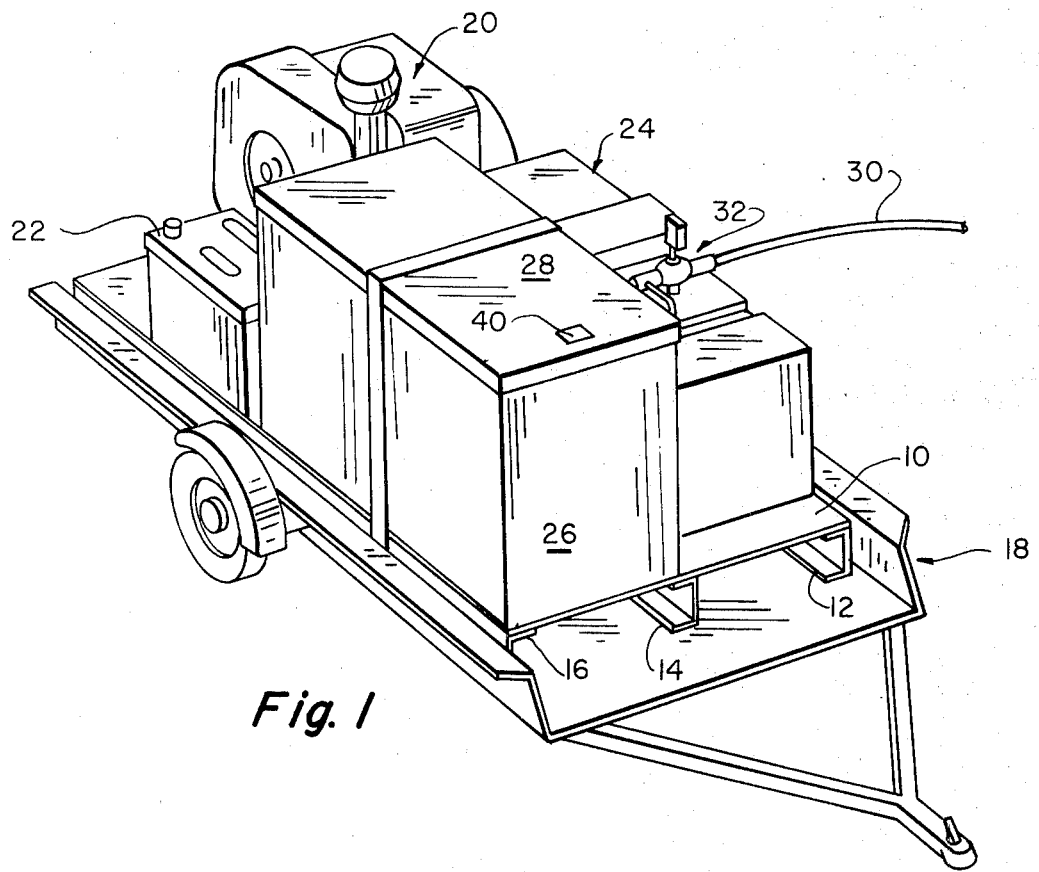
FIG. 1 is a perspective view of one form of a unit according to the invention, being a pallet mounted spray unit arranged for use of different types of wheeled carts.
Figure 2:
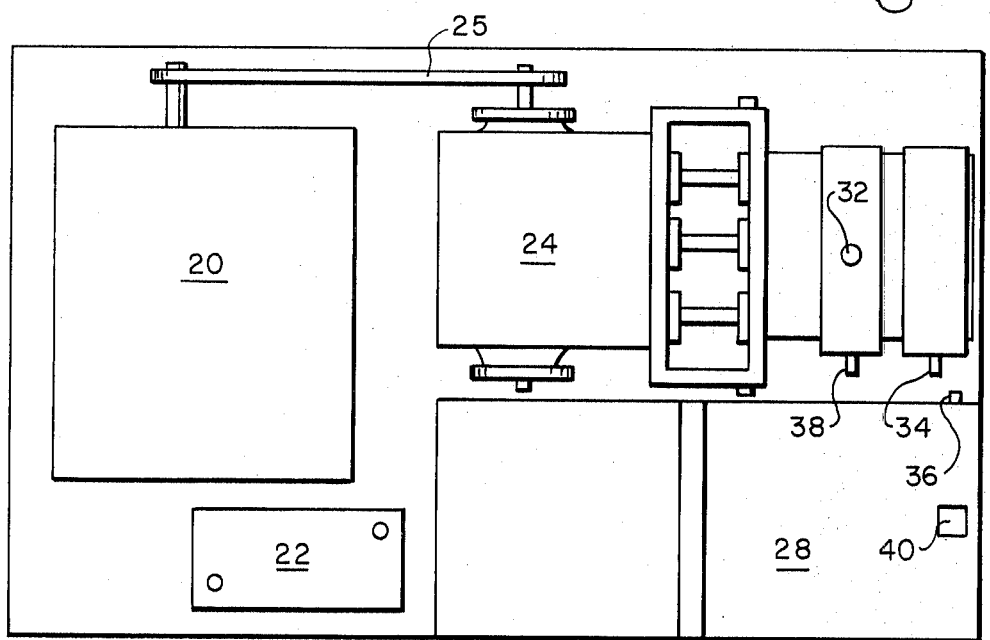
FIG. 2 is a schematic top plan view of the high pressure spray unit according to the invention.

In the device selected for illustration in FIG. 1, a steel plate 10, mounted on channels 12 and 14 and 16, provides a base for the unit and facilitates lifting the unit with a fork lift truck or the like. The base may be readily mounted on a trailer, shown in general by numeral 18, which in this case is a two-wheeled trailer arranged for hitching behind a vehicle. The sprayer assembly includes a gasoline engine 20, preferably air cooled, and preferably this is started by an electric starter operated by a battery 22. The gasoline engine 20 operates a high pressure pump, shown in general by numeral 24, preferably of a piston type pump, and one useful pump is a Worthington pump Triplex Model 10T. A tank 26 having a cover 28 provides a supply for fluid for exhausting through the pump and out a hose 30. A discharge piping arrangement, shown in general by numeral 32, and described in detail below, provides means for selection of liquid for washing or rinsing. Schematically shown in FIG. 2, an inlet or suction 34 for the pump is connected to an outlet 36 on the tank 26 and a discharge from the pump 38 passes through the discharge mechanism 32, explained below.

For some purposes the tank 26 may be a single compartment tank and a filler hole 40 provides means for access for filling fluids and/or detergent or other chemicals into the tank. In some instances, it may be desirable to have a two compartment tank, one containing a cleaning solution and the other clean water for use in remote areas. For the illustration as shown, the tank is a single compartment tank. A source of commercial or other water for clean water rinsing must be provided at the location of use.

The discharge mechanism is illustrated in FIG. 3, wherein a line 42, connected to outlet 38 (FIG. 2) of the pump, is connected to a tee 43, which has a 3000 pound pressure gauge 44 mounted on an arm of the tee. The outlet at the side of the tee 43 is connected through a bushing to a high pressure hose 45, which extends to a wand, spray gun or the like (not shown). A controllable relief valve 46, in a lateral of the gauge 44, controlled by a thumb screw 47, controls the pressure issuing through the hose 45. Excess fluid, under pressure, is bled back to the pump by a by-pass line 48. The relief valve provides an easy control of the pressure of the sprayer assembly.

The inlet mechanism to the pump 24 is shown in FIG. 4, wherein line 50, connected to the outlet 36 (FIG. 2) of the tank, is connected through a ball valve 51. This valve communicates with a tee 52 on one side. A ball valve 53 is connected to and communicates from the other side of the tee 52. A water connection tee bib 54 provides means for coupling to a water supply. The tee 52 is connected by a side arm to a tee 55 which has its side arm connected to pump inlet or suction 34. The opposite side of this tee is the by-pass line 48 from the discharge pressure controller 32.

Where the tank 26 is a two compartment tank, the bib 54 wound be connected to the clear water compartment of the tank and the line 50 would be connected to the detergent line. The two valves 51 and 53 control the type of fluid issuing from the unit. The valves may be fully opened or fully closed so as to provide either all detergent solution or all clear water. In some instances it may be desirable to mix the fluid going into the pump to provide the desired mixture of fluid issuing from the sprayer.

Using a gasoline engine rate for the altitude at which the sprayer is to be operated, the particular pump spray from a wand attached to the outlet hose may be issued up to about 4 gallons per minute at 3000 pounds working pressure. AT lesser pressures the gallonage may increase where desired. Where a water supply hose is available at a spray location, the hose can be attached directly to the pump in a unit; however, where it is not available the two compartment tank provides a self-contained unit for high pressure washing. For the Worthington Triplex pump mentioned above, a 30 horsepower engine is useful at a 5000 foot elevation, and an 18 horsepower engine is useful for sea level.

The unit is made of all conventional, commercial parts and is easily assembled on the skid. The skid may be used as a stationery high pressure supply or may be mounted on a trailer as shown in FIG. 1 for use around areas which are remote to power and water connections. Also, with the wheel mounted unit, shorter lengths of pressure hose may be use for the unit decreasing the danger of leaking or the like from such hoses.

I claim:

1. A high pressure, self-contained spray cleaning system comprising:

frame means having a flat mounting plate supported on a plurality of parallel channels;

a gasoline engine mounted on said mounting plate;

a high pressure piston type pump operatively connected with said engine;

a fluid supply tank mounted on said mounting plate and having at least two compartments, one said compartment containing detergent solution and another of said compartments containing fresh water;

inlet means for said pump;

a first supply line means extending from the detergent compartment of said tank to said inlet means for said pump including a shutoff valve;

a second supply line means extending from said fresh water container to said inlet means including a shutoff valve whereby said inlet means is supplied from either of said tank compartments;

outlet means from said pump including line means and nozzle means at the end of said line means for issuing a high pressure spray for performing a cleaning operation;

pressure control means in said outlet means for controlling the pressure issued from said pump; and by-pass means from said pressure control means to the inlet of said pump for recycling excess fluid not exhausted through said line means.

* * * * *

UNITED STATES PATENT OFFICE
CERTIFICATE OF CORRECTION

Patent No. 3,831,849                    Dated August 27, 1974

Inventor(s) John H. Studinger

It is certified that error appears in the above-identified patent and that said Letters Patent are hereby corrected as shown below:

Column 2, line 34, "wound" should be -- would --.

line 63, "use" should be -- used --.

Signed and sealed this 11th day of February 1975.

(SEAL)
Attest:

RUTH C. MASON
Attesting Officer

C. MARSHALL DANN
Commissioner of Patents
and Trademarks